(12) United States Patent
Kim et al.

(10) Patent No.: US 12,483,181 B2
(45) Date of Patent: Nov. 25, 2025

(54) IN-WHEEL MOTOR COOLING APPARATUS AND METHOD

(71) Applicants: HYUNDAI MOTOR COMPANY, Seoul (KR); KIA CORPORATION, Seoul (KR)

(72) Inventors: Yeonho Kim, Seoul (KR); GwanHyeong Cha, Seoul (KR); Hwanghi Park, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 223 days.

(21) Appl. No.: 18/388,098

(22) Filed: Nov. 8, 2023

(65) Prior Publication Data

US 2025/0055401 A1  Feb. 13, 2025

(30) Foreign Application Priority Data

Aug. 7, 2023  (KR) .................. 10-2023-0102810

(51) Int. Cl.
G05B 5/00  (2006.01)
B60K 7/00  (2006.01)
B60K 11/02  (2006.01)
H02P 29/60  (2016.01)

(52) U.S. Cl.
CPC ............ *H02P 29/60* (2016.02); *B60K 7/0007* (2013.01); *B60K 11/02* (2013.01)

(58) Field of Classification Search
CPC .................. H02P 29/60; H02P 8/14
See application file for complete search history.

(56) References Cited

FOREIGN PATENT DOCUMENTS

| CN | 103842221 A | * | 6/2014 | ............ B60T 13/662 |
| JP | 2005341701 A | * | 12/2005 | |

* cited by examiner

*Primary Examiner* — Karen Masih
(74) *Attorney, Agent, or Firm* — Lempia Summerfield Katz LLC

(57) ABSTRACT

An in-wheel motor cooling apparatus may include: a braking data calculation part configured to calculate a braking severity related to a braking data of a braking device of a driving state; a motor temperature measurement part configured to measure a temperature and a temperature change of the in-wheel motor of a driving-finished state; a driving controller configured to start driving of a water pump, in the driving-finished state, when the braking severity and the temperature change is above a predetermined standard; and a cooling flow control part configured to determine a cooling flow rate of the water pump in real-time based on a temperature of the in-wheel motor, when the driving of the water pump is started.

20 Claims, 7 Drawing Sheets

IN-WHEEL MOTOR COOLING APPARATUS AND METHOD

CROSS-REFERENCE TO RELATED APPLICATION

This application claims priority to and the benefit of Korean Patent Application No. 10-2023-0102810 filed in the Korean Intellectual Property Office on Aug. 7, 2023, the entire contents of which are incorporated herein by reference.

BACKGROUND

(a) Technical Field

The present disclosure relates to an in-wheel motor cooling apparatus and method. More particularly, the present disclosure relates to an in-wheel motor cooling apparatus and method capable of preventing degradation of the in-wheel motor.

(b) Description of the Related Art

In a vehicle driven by electrical power, such as a hybrid vehicle, a fuel cell vehicle, and an electric vehicle, an in-wheel drive system is a system in which a small individual motor is mounted on each wheel, instead of using a large single motor, to generate power and drive each wheel.

This in-wheel drive system is equipped with an individual motor (hereinafter referred to as an in-wheel motor) for each wheel, and the drive system is simpler than a car equipped with a large drive motor. Therefore, greater vehicle interior space is obtainable. Also, the rotation of the wheels may be directly controlled, providing the advantage of being able to omit complex power transmission devices.

In this way, since powertrain elements may be omitted, high efficiency and high performance may be obtained. In other words, by installing the in-wheel motor directly on each wheel, sufficient driving power may be secured by reducing power waste. By maximizing power distribution to respective in-wheel motors when driving and recollection of braking energy from regenerative braking, improvement of electrical efficiency may be obtained.

A braking device inside an in-wheel motor plays an important role in slowing down or stopping the vehicle. When the braking system operates the braking device, a large amount of heat is generated, and this heat must be removed from the inside of the in-wheel motor. If this heat is not properly managed, performance deterioration, life-shortening of components, and in serious cases, a failure of components or even fire of the in-wheel motor 100 may be caused.

The above information disclosed in this Background section is only to enhance understanding of the background of the disclosure. Therefore, the Background section may contain information that does not form the prior art that is already known to a person of ordinary skill in the art.

SUMMARY

The present disclosure provides an in-wheel motor cooling apparatus and method capable of cooling heat transferred to the in-wheel motor by radiation from a braking device during a key-off status or condition.

Embodiments provide an in-wheel motor cooling apparatus and method capable of monitoring a temperature change of the in-wheel motor in the key-off state and controlling driving of a water pump according to braking severity of the braking device before the key-off state.

An in-wheel motor cooling apparatus may include: a braking data calculation part configured to calculate a braking severity related to a braking data of a braking device in a driving state; a motor temperature measurement part configured to measure a temperature and a temperature change of the in-wheel motor in a driving-finished state; a driving controller configured to start driving of a water pump, in the driving-finished state, when the braking severity and the temperature change are above a predetermined standard; and a cooling flow control part configured to determine a cooling flow rate of the water pump in real-time based on a temperature of the in-wheel motor, when the driving of the water pump is started.

The driving state may be a key-on state in which the vehicle is turned on, and the driving-finished state may be a key-off state in which the vehicle is turned off.

The braking data calculation part may be configured to calculate the braking severity based on the braking data of the vehicle including a braking hydraulic pressure, a braking period, a driving speed, and a heat dissipation coefficient of the vehicle in the key-on state.

When the temperature of the in-wheel motor is greater than an emergency cooling temperature, the cooling flow control part may determine the cooling flow rate of the water pump as an emergency cooling flow rate that is a maximum flow amount of the water pump, where the emergency cooling temperature may be less than a predetermined motor management temperature of the in-wheel motor by a first temperature difference.

When the temperature of the in-wheel motor is greater than a basic cooling temperature and less than or equal to the emergency cooling temperature, the cooling flow control part may determine the cooling flow rate of the water pump as a basic cooling flow rate less than the emergency cooling flow rate, where the basic cooling temperature is less than the motor management temperature by a second temperature difference.

When the basic cooling flow rate is less than the cooling flow rate during the driving of a vehicle, the cooling flow control part may adjust the basic cooling flow rate to be equal to the cooling flow rate during the driving.

When the temperature of the in-wheel motor is less than or equal to the basic cooling temperature after the driving of the water pump is started, the driving controller may stop the driving of the water pump.

An in-wheel motor cooling method may include: calculating a braking severity of the vehicle during driving by an in-wheel motor cooling apparatus, when a vehicle is turned off; measuring a temperature and a temperature change of an in-wheel motor of the vehicle in a key-off state in which the vehicle is turned off, by the in-wheel motor cooling apparatus; controlling driving of a water pump, in the key-off mode, based on the calculated braking severity and the measured the temperature change of the in-wheel motor, by the in-wheel motor cooling apparatus; and controlling a cooling flow rate of the water pump in real-time based on a temperature of the in-wheel motor, by the in-wheel motor cooling apparatus, when driving of the water pump is started.

Calculating the braking severity may include calculating braking energy with a braking data of the vehicle including a braking hydraulic pressure, a braking period, a driving speed, and a heat dissipation coefficient, in a driving state at key-on of the vehicle.

Controlling the driving of the water pump may include starting the driving of the water pump if the braking energy is higher than a predetermined specific criterion and the temperature change of the in-wheel motor is greater than the predetermined specific criterion.

Controlling the cooling flow rate may include determining the cooling flow rate of the water pump as an emergency cooling flow rate that is a maximum flow amount of the water pump, when the temperature of the in-wheel motor is greater than an emergency cooling temperature, where the emergency cooling temperature is less than a predetermined motor management temperature of the in-wheel motor by a first temperature difference.

Controlling the cooling flow rate may further include determining the cooling flow rate of the water pump as a basic cooling flow rate less than the emergency cooling flow rate, when the temperature of the in-wheel motor is greater than a basic cooling temperature and less than or equal to the emergency cooling temperature, where the basic cooling temperature is less than the motor management temperature by a second temperature difference.

Determining the cooling flow rate as the basic cooling flow rate may include adjusting the basic cooling flow rate to be equal to the cooling flow rate at the key-on state, when the basic cooling flow rate is less than the cooling flow rate at the key-on of the vehicle.

Controlling the driving of the water pump may further include stopping the driving of the water pump, after the driving of the water pump is started, when the temperature of the in-wheel motor is less than or equal to the basic cooling temperature.

An in-wheel motor cooling method may include: calculating a temperature increase amount of the in-wheel motor based on an initial temperature of a braking device after a key-off state of a vehicle; calculating a maximum reached temperature of the in-wheel motor based on the initial temperature and the temperature increase amount after a key-off state of the in-wheel motor; calculating a cooling target temperature of the in-wheel motor based on a difference value between the maximum reached temperature and a limit temperature of the in-wheel motor; and measuring a real-time temperature of the in-wheel motor and driving a water pump until the real-time temperature is below the cooling target temperature.

A temperature increase amount of the in-wheel motor may be proportional to the initial temperature of the braking device.

Driving of the water pump may include calculating a temperature difference between an ambient air temperature and the cooling target temperature and controlling a cooling flow rate of the water pump based on the calculated temperature difference.

Controlling the cooling flow rate may include: determining the cooling flow rate of the water pump as a basic cooling flow rate when the temperature difference between the cooling target temperature and the ambient air temperature is more than a specific criterion; and determining the cooling flow rate as an emergency cooling flow rate when the temperature difference is less than the specific criterion, where the emergency cooling flow rate is more than the basic cooling flow rate.

Calculating the cooling target temperature may include determining a resulting value obtained by subtracting the difference value from the initial temperature of the in-wheel motor as the cooling target temperature when the difference value between the maximum reached temperature and the limit temperature is calculated.

An in-wheel motor cooling method may further include maintaining the maximum reached temperature of the in-wheel motor below the limit temperature of the in-wheel motor.

According to an in-wheel motor cooling apparatus and method of an embodiment, the heat transferred to the in-wheel motor by radiation from the braking device may be cooled during the key-off state.

According to an in-wheel motor cooling apparatus and method of an embodiment, a temperature change of the in-wheel motor may be monitored in the key-off state and driving of a water pump may be controlled according to braking severity of the braking device before the key-off state.

DETAILED DESCRIPTION OF THE EMBODIMENTS

Figure 1:
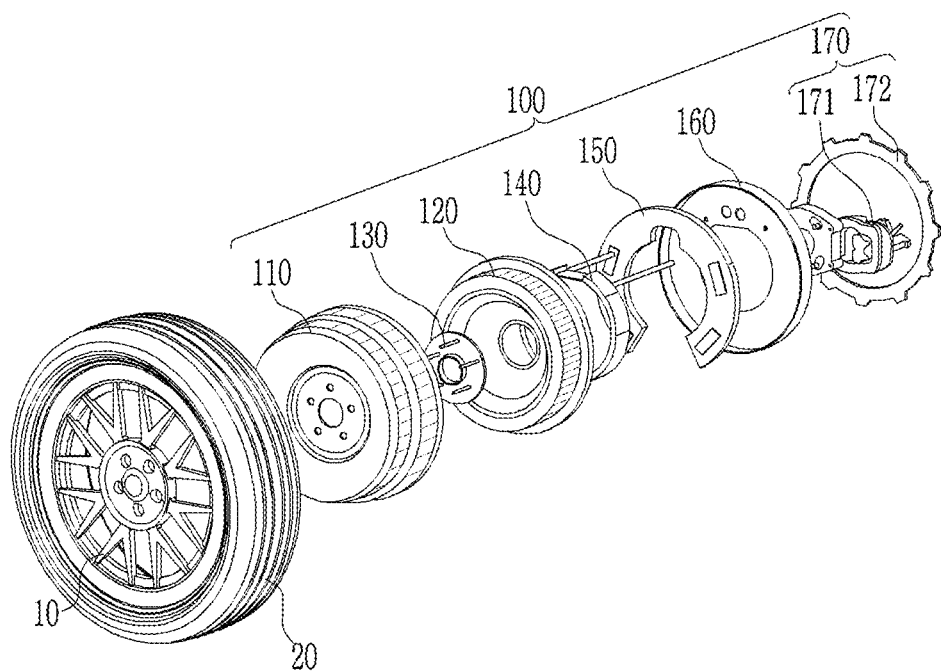
FIG. 1 is an exploded perspective view showing an in-wheel motor according to an embodiment.

Embodiments of the disclosure are described more fully hereinafter with reference to the accompanying drawings such that a person of ordinary skill in the art may readily implement the disclosed embodiments. As those of ordinary skill in the art should realize, the described embodiments may be modified in various different ways, all without departing from the spirit or scope of the present disclosure. In order to clarify the present disclosure, parts that are not related to the description have been omitted, and the same elements or equivalents are referred to with the same reference numerals throughout the specification.

In addition, unless explicitly described to the contrary, the word "comprise" and variations such as "comprises" or "comprising" should be understood to imply the inclusion of stated elements but not the exclusion of any other elements. Terms including an ordinary number, such as first and second, are used for describing various constituent elements, but the constituent elements are not limited by the terms. The terms are only used to differentiate one component from other components.

In addition, the terms "unit", "part" or "portion", "-er", and "module" in the specification refer to a unit that processes at least one function or operation, which may be implemented by hardware, software, or a combination thereof. When a component, device, element, or the like, of the present disclosure, is described as having a purpose or performing an operation, function, or the like, the component, device, or element should be considered herein as being "configured to" meet that purpose or to perform that operation or function.

Hereinafter, embodiments of the present disclosure are described with reference to the drawings.

FIG. 1 is an exploded perspective view showing an in-wheel motor 100 according to an embodiment.

FIG. 1 shows an exploded view of a vehicle wheel including a wheel 10, a tire 20, and an in-wheel motor 100. According to an embodiment, a wheel may include an in-wheel motor 100 inside the wheel 10. The in-wheel motor 100 may include a braking device 170.

The wheel 10 is mainly made of metal and rotates about a central axis. The wheel 10 functions to support the tire, reduces shock received from the road, and supports the weight of the vehicle. The tire 20 surrounds the outside of the wheel 10 and is mainly made of rubber and steel wire. The tire 20 may control the direction and speed of the vehicle using friction with the road surface. The tire 20 absorbs shock from the road surface to provide a comfortable driving environment and increase vehicle safety.

Referring to FIG. 1, the in-wheel motor 100 includes a rotor 110, a stator 120, a bearing 130, a capacitor ring 140, power electronics 150, a protection cover 160 and the braking device 170. The braking device 170 includes a caliper 171 and a disk 172.

An in-wheel motor 100 is an electric vehicle drive system that drives the wheels by directly mounting an electric motor on each wheel. Unlike the traditional drive method using an internal combustion engine and transmission, efficient energy transfer is possible because the wheels and motor are directly connected.

The rotor 110 is a part that rotates by receiving electricity from the in-wheel motor 100. The rotor 110 serves to transmit the rotational force of the motor to the wheels. Rotation of the rotor 110 is the main means of converting electrical power into mechanical energy. The stator 120 is a fixed part of the in-wheel motor 100 and is often made of a coil or magnet. When electrical energy passes through the stator 120, a magnetic field is generated, and this magnetic field rotates the rotor 110.

The bearing 130 is a component that allows the shaft to rotate between the rotor 110 and the stator 120 and supports internal components to rotate smoothly. The bearing 130 allows the rotor 110 to move smoothly and reduces friction to minimize power loss.

The capacitor ring 140 provides additional current needed when the in-wheel motor 100 starts. The capacitor ring 140 may be automatically disconnected from the circuit when the in-wheel motor 100 starts rotating normally. In other words, the capacitor ring 140 provides additional current to support stator 120.

The power electronics 150 is an electronic device for power conversion and control. The power electronics 150 may control the power of the in-wheel motor 100, adjust speed and torque, regenerate braking energy, and efficiently manage the battery. For example, the power electronics 150 may include an inverter, a converter, a direct current to direct current (DC-DC) converter, and a control system.

The inverter converts direct current (DC) power provided by the battery into alternating current (AC) power to drive the motor. The inverter may control the rotation speed of the motor. The converter converts the battery's voltage to provide the required voltage. The converter provides the voltage needed to operate the inverter or is used to supply power to other electronic systems of the vehicle. The DC-DC converter provides the necessary voltage for other electronic systems of the vehicle. The control system controls the torque, speed, direction, and the like, of the in-wheel motor 100. In addition, a battery management system (BMS) may monitor the state of charge of the battery and protect the battery when necessary. The power electronics 150 in the in-wheel motor 100 is responsible for power conversion and control, and motor control.

The protection cover 160 protects the internal components of the in-wheel motor 100. The protection cover 160 protects the inside of the in-wheel motor 100 from external factors such as dust, water, and stones, and may prevent internal components from being damaged by absorbing shock when the in-wheel motor 100 receives a direct impact. In general, the protection cover 160 is made of sturdy metal or plastic, and is designed to perfectly fit the shape and size of the in-wheel motor 100. For example, the protection cover 160 may fully cover the in-wheel motor 100, possibly being equipped with cooling functions such as ventilation holes or cooling fins.

In the case of the in-wheel motor 100, while a mechanical braking device may exist in the form of a disk brake directly connected to the wheel, the in-wheel motor 100 itself may perform regenerative braking. The braking device 170 may exist inside the wheel or in-wheel motor 100 of the vehicle. The braking device 170 may include the caliper 171 and the disk 172.

The caliper 171 is a major component of a braking device and serves to reduce or stop rotation of a wheel by applying pressure to a brake pad on a disc.

The disc 172 is a metal plate that rotates with the wheel, and the brake pad is pressed against the disc by the caliper 171, thereby reducing or stopping the rotation of the wheel. The braking device 170 included inside the in-wheel motor 100 may operate together with regenerative braking to improve braking performance and energy efficiency of the vehicle.

A large amount of heat is generated when the braking device 170 inside the in-wheel motor 100 operates, and if this heat is not properly managed, depending on degradation phenomenon, performance deterioration, life-shortening of components, and in serious cases, a failure of components or even fire of the in-wheel motor 100 may be caused. Hereinafter, a cooling system, cooling device, and cooling method are proposed to prevent failure of the in-wheel motor 100 due to such degradation phenomenon.

Figure 2:
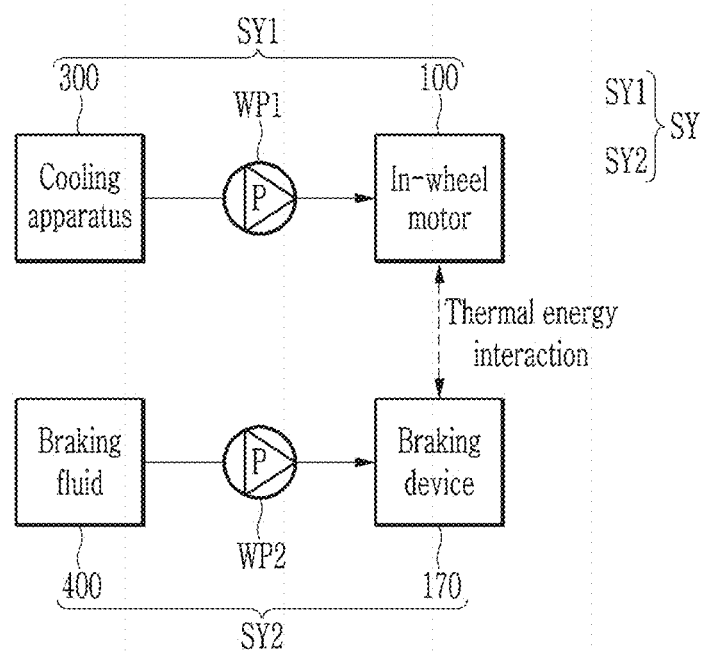
FIG. 2 is a drawing showing a cooling system of an in-wheel motor according to an embodiment.

FIG. 2 is a drawing showing a cooling system of an in-wheel motor according to an embodiment.

Referring to FIG. 2, a cooling system SY of the in-wheel motor 100 may include a first system SY1 and a second system SY2. The first system SY1 includes the in-wheel motor 100, a cooling apparatus 300 and a water pump WP1. The cooling apparatus 300 may be referred to as an in-wheel motor cooling apparatus 300 and is responsible for cooling of the in-wheel motor 100. For example, the in-wheel motor cooling apparatus 300 is configured to measure a temperature of the in-wheel motor 100 and control the water pump WP1. The water pump WP1 may supply a cooling fluid at a cooling flow rate appropriate for the in-wheel motor 100, under the control of the in-wheel motor cooling apparatus 300. Here, the in-wheel motor 100 may be used to mean the concept including all components such as the rotor and stator, excluding the braking device 170, for differentiation of the scope of the terms.

The second system SY2 includes the braking device 170, a braking fluid 400, and a fluid pump WP2. The braking fluid 400 transfers pressure when the piston moves. The pressure may be transferred to the brake pad and the disc or drum of a braking system through the braking fluid 400. The braking fluid 400 is a mixture primarily based on water and ethanol, and has a high boiling point, a low freezing point, and sufficient hydraulic properties. The braking fluid 400 must not evaporate even at particularly high temperatures and have properties to prevent corrosion within the system. The fluid pump WP2 supplies the braking fluid 400 to the braking device 170.

In the first system SY1, in a key-on state in which the vehicle is turned on since the in-wheel motor 100 is being driven, the in-wheel motor 100 may perform cooling in real-time through the in-wheel motor cooling apparatus 300. In addition, during an operation of the in-wheel motor 100, the heat of the in-wheel motor 100 may be cooled by ambient air.

However, in a key-off state in which the vehicle is turned off since the in-wheel motor 100 is not operated, the in-wheel motor cooling apparatus 300 does not operate on its own. In addition, since the vehicle is not being driven, the heat of the in-wheel motor 100 is not cooled by the air. Therefore, the heat generated at the in-wheel motor 100 needs to be cooled in the key-off state of the vehicle. Particularly, in the key-off state, it is necessary to prevent the temperature of the in-wheel motor 100 from rising due to heat transferred from the adjacent braking device 170 through radiation, rather than heat generated by the operation of the in-wheel motor 100.

In an embodiment, in the key-off state, the cooling system SY of the in-wheel motor 100 may cool the in-wheel motor 100 in consideration of the transfer of thermal energy by the interaction between the first system SY1 and the second system SY2. For example, the in-wheel motor cooling apparatus 300 of the first system SY1 may control the water pump WP1 in consideration of radiation heat transferred from the braking device 170 of the second system SY2 to the in-wheel motor 100.

The in-wheel motor cooling apparatus 300 may calculate a braking data of the braking device 170 collected in the key-on state of the vehicle. The in-wheel motor cooling apparatus 300 may also determine whether to drive the water pump WP1, in consideration of the calculated braking data and a temperature change of the in-wheel motor 100 in the key-off state. The in-wheel motor cooling apparatus 300 may, if it has determined to drive the water pump WP1 in the key-off state according to the braking data and the temperature change of the in-wheel motor 100, variably determine the cooling flow rate of the water pump WP1 based on the real-time temperature of the in-wheel motor 100.

Figure 3:
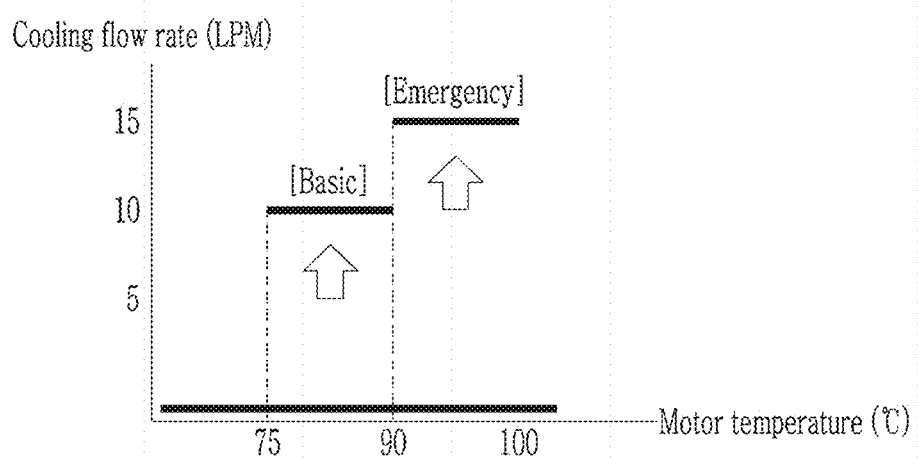
FIG. 3 is a graph showing an effect according to an in-wheel motor cooling apparatus according to an embodiment.

FIG. 3 is a graph showing an effect according to an in-wheel motor cooling apparatus according to an embodiment. This is explained together with FIG. 2.

In FIG. 3, conventionally, the in-wheel motor cooling apparatus 300 does not operate in the key-off state, in which the in-wheel motor 100 does not operate. Therefore, the cooling flow rate of the water pump WP1 is maintained at 0 liters per minute (LPM). In an embodiment, as has been described in connection with FIG. 2, the in-wheel motor cooling apparatus 300 may also operate based on the braking data and the temperature change of the in-wheel motor 100 of the key-off state, in the key-off state. In other words, when the braking data and the temperature change of the in-wheel motor 100 satisfies a specific criterion, the in-wheel motor cooling apparatus 300 drives the water pump WP1.

When the in-wheel motor cooling apparatus 300 starts operating, it may control the cooling flow rate of the water pump WP1 on a basic or emergency basis based on the real-time temperature of the in-wheel motor 100. For example, supposing that a motor management temperature is 100° C., the in-wheel motor cooling apparatus 300 may control the water pump WP1 in an emergency cooling flow rate when a current temperature of the in-wheel motor 100 is greater than 90° C. The in-wheel motor cooling apparatus 300 may also control the water pump WP1 in a basic cooling flow rate when the current temperature of the in-wheel motor 100 is greater than 75° C. and less than or equal to 90° C. For example, when a maximum cooling flow rate of the water pump WP1 is 15 LPM, the emergency cooling flow rate may be equal to the maximum cooling flow rate, and the basic cooling flow rate may be 10 LPM. This is explained in detail with reference to FIG. 4 and FIG. 5.

Figure 4:
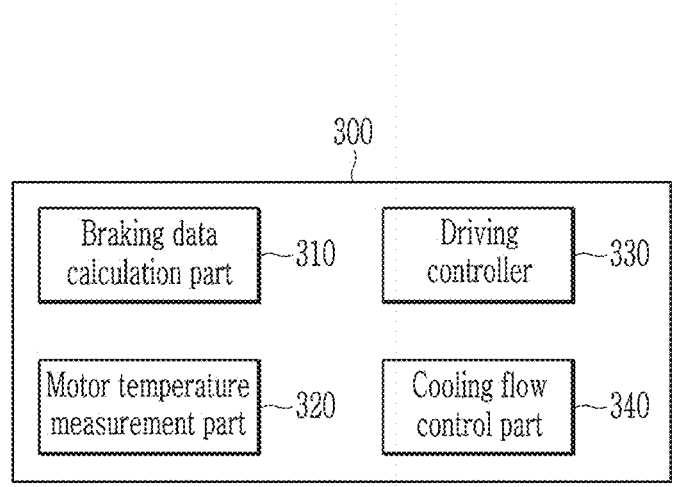
FIG. 4 is a block diagram of an in-wheel motor cooling apparatus according to an embodiment.

FIG. 4 is a block diagram of an in-wheel motor cooling apparatus according to an embodiment.

Referring to FIG. 4, the in-wheel motor cooling apparatus 300 includes the braking data calculation part 310, a motor temperature measurement part 320, a driving controller 330 and a cooling flow control part 340.

Hereinafter, a driving state may mean the key-on state in which the vehicle is turned on, and a driving-finished state may mean the key-off state in which the vehicle is turned off. Driving of the vehicle occurs in the key-on state. However, an in-wheel motor cooling apparatus according to an embodiment may operate in the key-off state.

The braking data calculation part 310 may calculate a braking severity related to the braking data of the braking device of the driving state. The braking severity may be a measure indicating, in the driving state, how many times braking of the vehicle has occurred or how heavy or severe was the braking of the vehicle.

The braking severity may be calculated based on the braking data according to braking occurring during driving of the vehicle when in the key-on state. For example, the braking severity may be calculated based on the various braking data of the vehicle collected from the braking device, which includes a braking force, a braking distance, a braking hydraulic pressure, a braking period, a driving speed, a transfer efficiency, and a heat dissipation coefficient.

When the vehicle is turned off, the braking data calculation part 310 may calculate the braking severity based on the braking data collected according to the braking having occurred while driving in the key-on state.

The motor temperature measurement part 320 may measure the temperature and the temperature change of the in-wheel motor 100 in the driving-finished state. In other words, the motor temperature measurement part 320 may measure the temperature change of the in-wheel motor 100 and real-time temperature in the key-off state.

In the driving-finished state, when the braking severity and the temperature change of the in-wheel motor 100 is a predetermined standard or above, the driving controller 330 may start driving the water pump WP1 (refer to FIG. 2).

When the vehicle is turned off (i.e., key-off or in the key-off state), the driving controller 330 receives the braking severity from the braking data calculation part 310 and receives the temperature change of the in-wheel motor 100 from the motor temperature measurement part 320 and may drive the water pump WP1 when each of them is a predetermined reference value or above.

When driving of the water pump WP1 is started, the cooling flow control part 340 may determine the cooling flow rate of the water pump WP1 in real-time based on the temperature of the in-wheel motor 100. The cooling flow control part 340 may control the cooling flow rate of the water pump WP1 based on the current temperature of the in-wheel motor 100 measured in real-time by the motor temperature measurement part 320. For example, according to preset criteria, the cooling flow control part 340 may increase the cooling flow rate when it is determined that the temperature of the in-wheel motor 100 is close to the motor management temperature and may decrease the cooling flow rate when it is determined that the temperature of the in-wheel motor 100 is not close to the motor management temperature.

Figure 5:
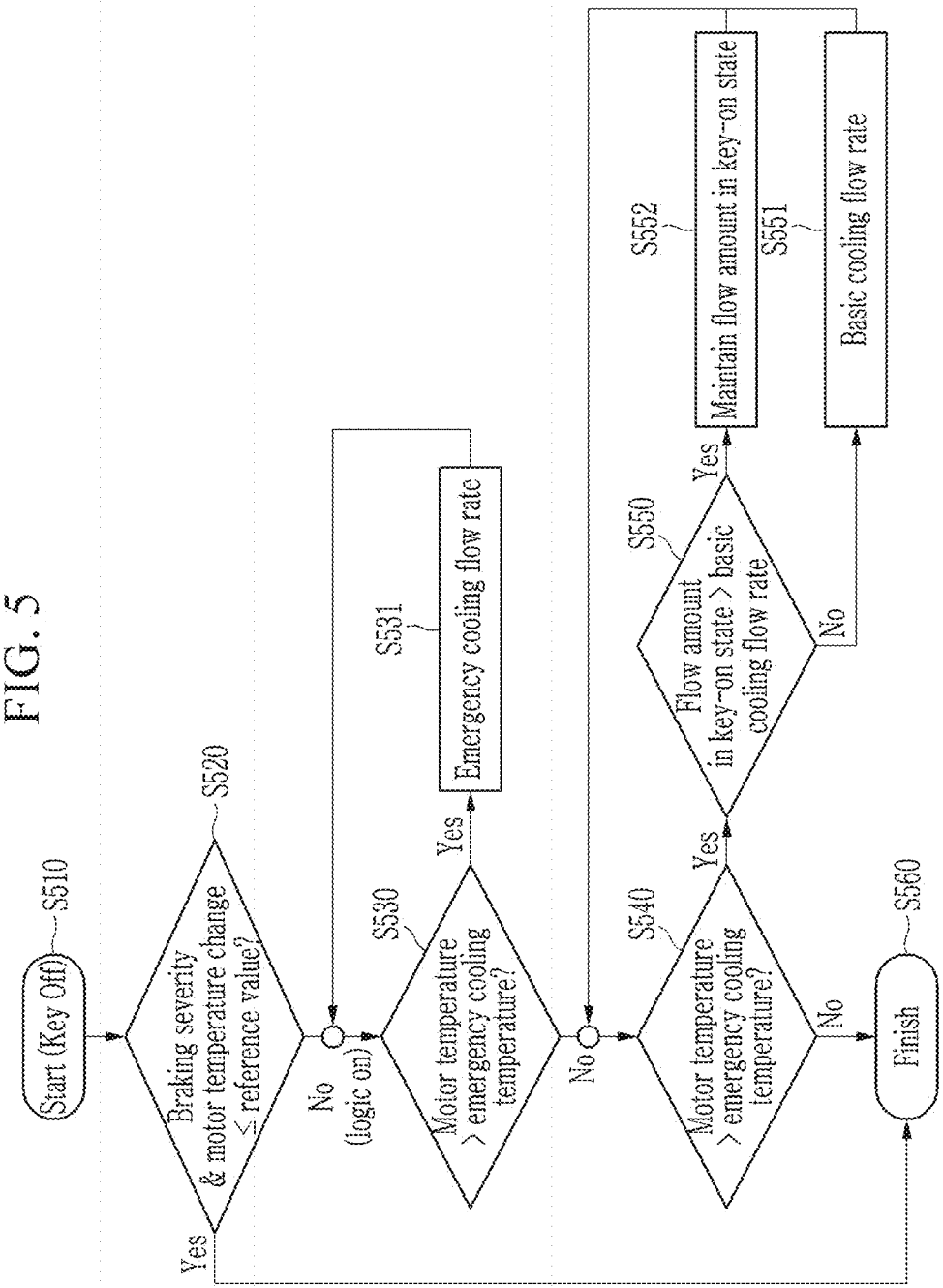
FIG. 5 is a flowchart of an in-wheel motor cooling method according to an embodiment.

FIG. 5 is a flowchart of an in-wheel motor cooling method according to an embodiment. The in-wheel motor cooling method of FIG. 5 may be performed by the in-wheel motor cooling apparatus 300. This is explained with reference to FIG. 4.

In FIG. 5, at step S510, when the vehicle is turned off, the in-wheel motor cooling apparatus 300 may calculate the braking severity of the vehicle during driving. The braking severity of the vehicle may be calculated based on the various braking data of the vehicle collected from the braking device while driving, which include a braking force, a braking distance, a braking hydraulic pressure, a braking period, a driving speed, a transfer efficiency, and a heat dissipation coefficient.

Since the temperature of the braking device 170 (refer to FIG. 1) may be raised above approximately 500° C., it may be difficult to directly calculate its temperature. Therefore, the in-wheel motor cooling apparatus 300 may calculate the braking severity based on the braking data, and then may estimate the amount of heat generated at the braking device. In addition, if the logic is operated only by the braking hydraulic pressure, it is difficult to distinguish between the stoppage and the driving, it is difficult to distinguish the amount of deceleration, and it is difficult to determine the effect of braking thermal energy, for which reason, the in-wheel motor cooling apparatus 300 is set by the reference of the defined braking severity.

For example, the braking severity may be calculated as braking energy (i.e., rate or work, calories, BTU's, kw, hp, or the like) based on the various braking data of the vehicle. Here, the braking energy may mean the amount of heat generated during the process of converting the kinetic energy to the thermal energy by the braking device of the vehicle in order to reduce the speed. For example, the braking energy may be calculated from a braking period, a driving speed, a transfer efficiency, a braking hydraulic pressure, and various braking factors.

At the step S510, the in-wheel motor cooling apparatus 300 may measure the temperature and the temperature change of the in-wheel motor 100 in the key-off state. Since the temperature of the in-wheel motor 100 may be approximately 50° C. to 140° C. in normal cases, the motor temperature measurement part 320 (refer to FIG. 4) may directly measure the temperature.

The in-wheel motor cooling apparatus 300 may control the driving of the water pump WP1 based on the braking severity and the temperature change of the in-wheel motor 100 in the key-off state. At step S520, when the braking energy is higher than the predetermined specific criterion and the temperature change of the in-wheel motor 100 is higher than the specific criterion, the in-wheel motor cooling apparatus 300 may start the driving of the water pump WP1. For example, when the braking energy in calories at the key-off exceeds 300 kcal and the temperature change of the in-wheel motor 100 exceeds 0.1° C./sec, the in-wheel motor cooling apparatus 300 may drive the water pump WP1 in order to start the cooling of the in-wheel motor 100. To the contrary, when the braking energy and the temperature change of the in-wheel motor 100 is the specific criterion or below, the in-wheel motor cooling apparatus 300 does not drive the water pump.

The in-wheel motor cooling apparatus 300 may control the cooling flow rate of the water pump in real-time based on the temperature of the in-wheel motor 100.

The in-wheel motor cooling apparatus 300 may measure the current temperature of the in-wheel motor 100 through the motor temperature measurement part 320. The in-wheel motor cooling apparatus 300 may an emergency cooling temperature based on a motor management temperature established in the in-wheel motor 100. In one embodiment, the emergency cooling temperature may be determined to be a temperature less than the motor management temperature of the in-wheel motor 100 by the first temperature difference. For example, when the motor management temperature is 100° C., the in-wheel motor cooling apparatus 300 may set the emergency cooling temperature as 90° C. In other words, the first temperature difference may be approximately 10° C.

At step S530, the in-wheel motor cooling apparatus 300 may compare the current temperature of the in-wheel motor 100 with the emergency cooling temperature.

At step S531, when the temperature of the in-wheel motor 100 is greater than the emergency cooling temperature, the in-wheel motor cooling apparatus 300 may determine the cooling flow rate of the water pump WP1 as the emergency cooling flow rate that is a maximum flow amount of the water pump WP1 through the cooling flow control part 340. For example, when the maximum flow amount of the water pump WP1 is 15 LPM, the in-wheel motor cooling apparatus 300 may determine the emergency cooling flow rate as 15 LPM. When the temperature of the in-wheel motor 100 is more than the emergency cooling temperature, the in-wheel motor cooling apparatus 300 may drive the water pump WP1 at the predetermined maximum flow amount, prioritizing protection of the in-wheel motor 100, with little consideration of efficiency.

The in-wheel motor cooling apparatus 300 may set a basic cooling temperature based on the motor management temperature. The in-wheel motor cooling apparatus 300 may determine the basic cooling temperature as a temperature lower than the motor management temperature by a second temperature difference. For example, when the motor management temperature is 100° C., the basic cooling temperature may be set as 75° C. In other words, the second temperature difference may be 25° C. It may be understood that the second temperature difference is more than the first temperature difference.

At step S540, the in-wheel motor cooling apparatus 300 may compare the current temperature of the in-wheel motor 100 with the basic cooling temperature.

At step S550, when the temperature of the in-wheel motor 100 is greater than the basic cooling temperature and less than or equal to the emergency cooling temperature, the in-wheel motor cooling apparatus 300 may determine the cooling flow rate of the water pump WP1 as the basic cooling flow rate through the cooling flow control part 340, and may compare the cooling flow rate and the basic cooling flow rate in the key-on state.

At step S551, as a result of comparing the cooling flow rate and the basic cooling flow rate in the key-on state, when the basic cooling flow rate is greater than the cooling flow rate in the key-on state, the in-wheel motor cooling apparatus 300 may maintain the cooling flow rate as the basic cooling flow rate. The basic cooling flow rate may be less than the emergency cooling flow rate. For example, when the maximum flow amount of the water pump WP1 is 15 LPM, the basic cooling flow rate may be 10 LPM to 12 LPM. The in-wheel motor cooling apparatus 300 may determine an optimal flow amount in view of the electrical power consumption optimization as well as the protection of the in-wheel motor 100 as the basic cooling flow rate.

At step S552, when the basic cooling flow rate is less than the cooling flow rate in the key-on state, the in-wheel motor cooling apparatus 300 may adjust the basic cooling flow rate to be the same as the cooling flow rate in the key-on state. In other words, when the cooling flow rate in the key-off state becomes less than the cooling flow rate in the key-on state, the in-wheel motor cooling apparatus 300 may determine it to be inefficient and may maintain the cooling flow rate in the key-off state to be at least the cooling flow rate in the key-on state.

At step S560, when the temperature of the in-wheel motor 100 becomes less than the basic cooling temperature after the driving of the water pump WP1 is started, the in-wheel motor cooling apparatus 300 may stop the driving of the water pump WP1. An in-wheel motor cooling apparatus according to an embodiment operates in order for protection of the in-wheel motor 100. Therefore, when it is determined that the temperature of the in-wheel motor 100 has sufficient difference from the motor management temperature against heat transfer from the braking device, the logic is finished and the driving of the water pump WP1 may be stopped. In other words, in consideration of minimization of electrical power consumption, NVH (noise, vibration, harshness), and occupant's environment, the present logic of the in-wheel motor cooling method may be stopped as early as possible.

Figure 6:
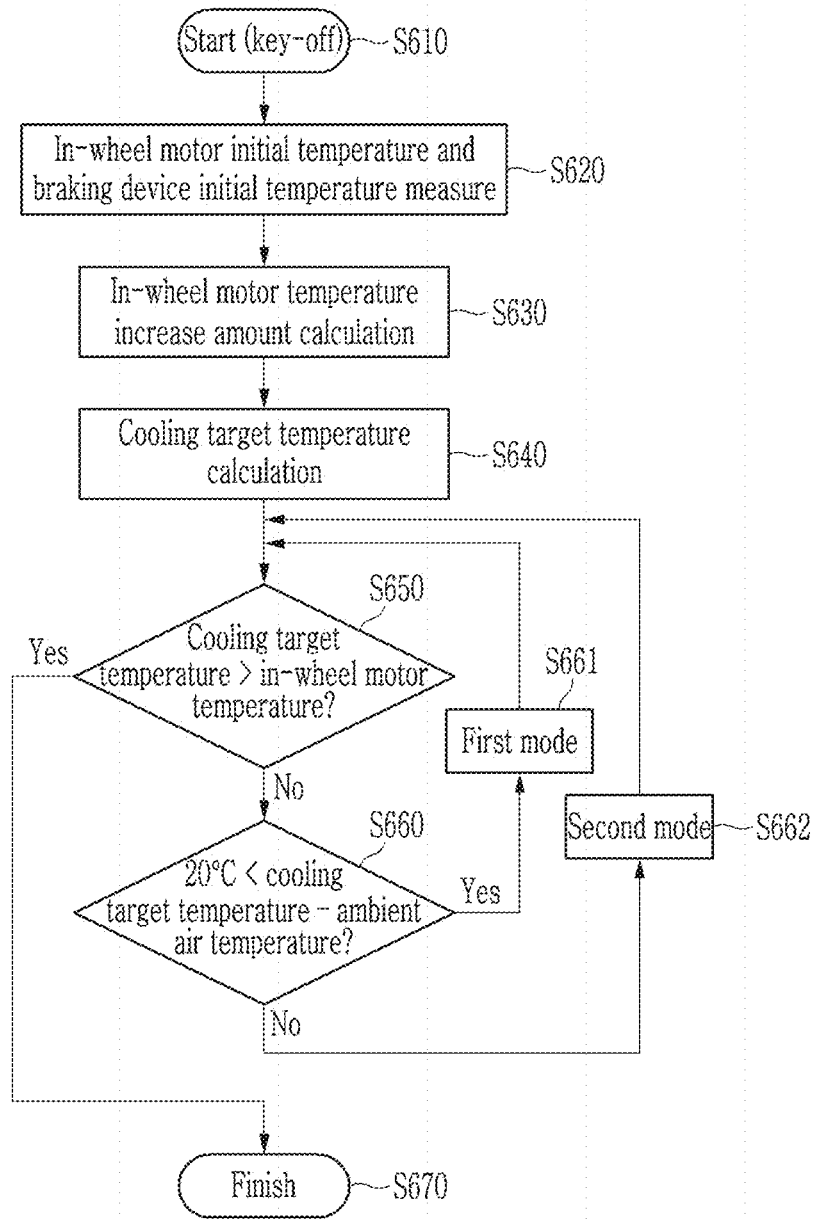
FIG. 6 is a flowchart of an in-wheel motor cooling method according to another embodiment.
Figure 7:
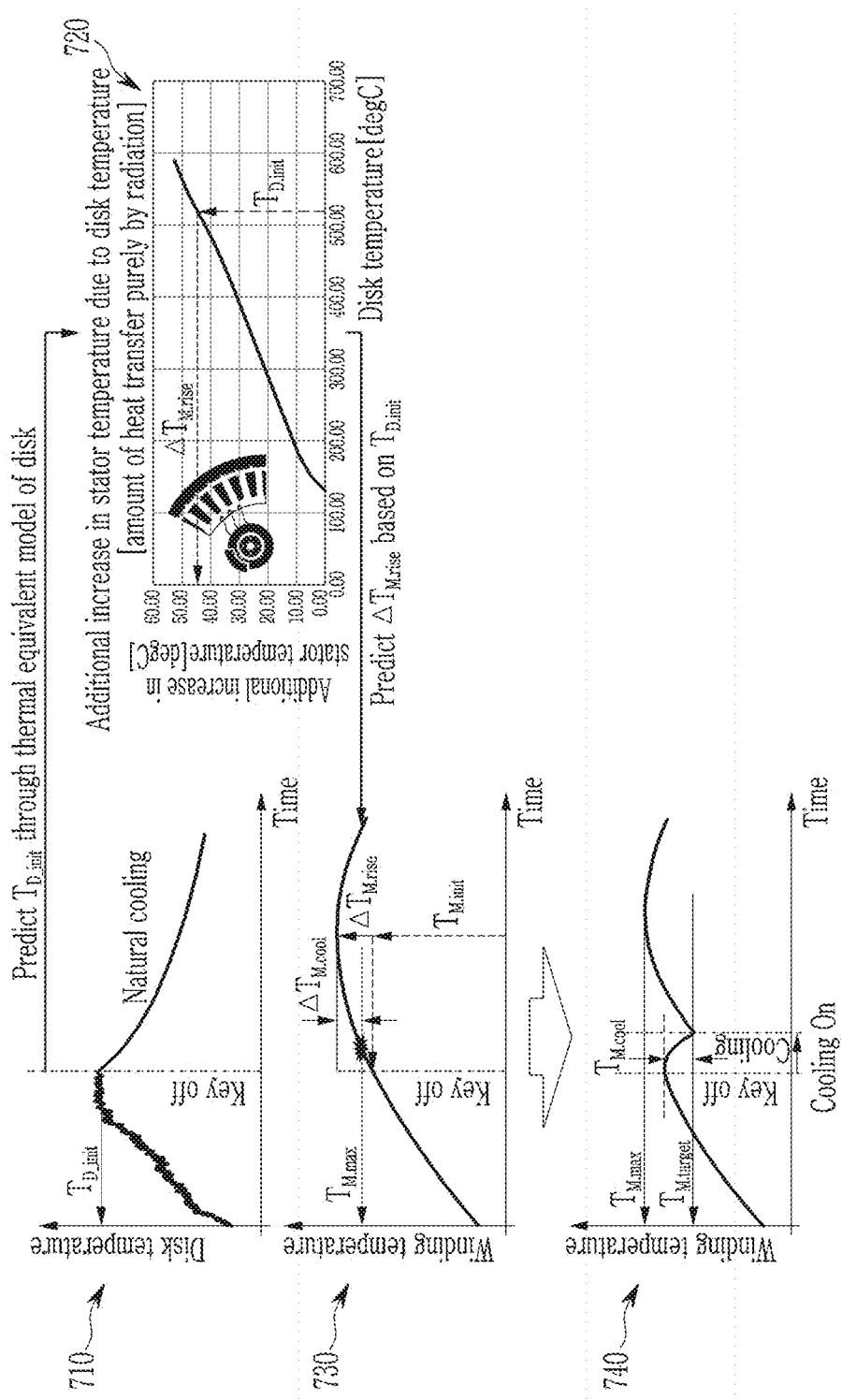
FIG. 7 shows graphs for explaining an in-wheel motor cooling method.

FIG. 6 is a flowchart of an in-wheel motor cooling method according to another embodiment. FIG. 7 shows graphs for explaining an in-wheel motor cooling method. The in-wheel motor cooling method according to an embodiment may be performed through the in-wheel motor cooling apparatus 300 (refer to FIG. 2).

The in-wheel motor cooling method of FIG. 6 may estimate a temperature increase amount of the in-wheel motor 100 through the temperature of the braking device and cool the in-wheel motor based on the temperature increase amount. The in-wheel motor cooling method assumes that the temperature increase amount of the in-wheel motor 100 is determined by the initial temperature of the braking device regardless of an initial temperature of the in-wheel motor 100 in the key-off state. The in-wheel motor cooling method directly calculates how large heat is transferred from the disk of the braking device to the in-wheel motor after the vehicle is turned off and may determine the cooling flow rate of the water pump WP1 based on this.

In FIG. 6 and FIG. 7, the vehicle is in the key-off state at step S610, the in-wheel motor cooling apparatus 300 measures the initial temperature of the braking device $T_{D\_init}$ and the initial temperature $T_{M.init}$ of the in-wheel motor 100, at step S620. The initial temperature of the braking device 170 (refer to FIG. 1) may be the initial temperature of the disk 172 (refer to FIG. 1). The initial temperature $T_{D\_init}$ of the braking device 170 may be measured through the disk temperature at the time point of key-off (i.e., turning off) of the vehicle that appears through a thermal equivalent model 720. In a first graph 710, the disk temperature may be naturally cooled after the key-off. The initial temperature $T_{M.init}$ of the in-wheel motor 100 may be calculated as the temperature of the in-wheel motor 100 at the time point of the key-off through CAN communication.

At step S630, the in-wheel motor cooling apparatus 300 may calculate the temperature increase amount $\Delta T_{M.rise}$ of the in-wheel motor 100 based on the initial temperature of the braking device $T_{D\_init}$. When referring to the thermal equivalent model 720, the temperature increase amount $\Delta T_{M.rise}$ of the in-wheel motor 100 may be proportional to the initial temperature $T_{D\_init}$ of the braking device. The amount of heat transfer due to the temperature change of the in-wheel motor 100 (e.g., 20° C. to 150° C.) is significantly lower than that of the disc, which may rise to about 500° C. or more.

The in-wheel motor cooling apparatus 300 may calculate a maximum reached temperature $T_{M.init}+\Delta T_{M.rise}$ of the in-wheel motor 100 based on the initial temperature $T_{M.init}$ and the temperature increase amount $\Delta T_{M.rise}$ after the key-off of the in-wheel motor 100. In a second graph 730, the maximum reached temperature $T_{M.init}+\Delta T_{M.rise}$ of the in-wheel motor 100 may be higher than a limit temperature $T_{M.max}$ of the in-wheel motor 100.

At step S640, the in-wheel motor cooling apparatus 300 may calculate a cooling target temperature $T_{M.target}$ of the in-wheel motor 100 based on a difference value of the maximum reached temperature and the limit temperature $T_{M.max}$ of the in-wheel motor 100, which is $T_{M.int}+\Delta T_{M.rise}-T_{M.max}$.

In an embodiment, the in-wheel motor cooling apparatus 300 may determine the difference value between the maximum reached temperature $T_{M.init}+\Delta T_{M.rise}$ and the limit temperature $T_{M.max}$ of the in-wheel motor 100, which is $T_{M.init}+\Delta T_{M.rise}-T_{M.max}$, as a temperature decrease amount $\Delta T_{M.cool}$ required for the in-wheel motor 100. The in-wheel motor cooling apparatus 300 may determine a value $T_{M.init}-T_{M.cool}$ obtained by subtracting the required temperature decrease amount $\Delta T_{M.cool}$ from the initial temperature $T_{M.int}$ of the in-wheel motor 100, as the cooling target temperature $T_{M.target}$. The limit temperature $T_{M.max}$ of the in-wheel motor 100 may be the limit temperature of the winding of the in-wheel motor 100.

In a third graph 740, the in-wheel motor cooling apparatus 300 may cool the temperature of the in-wheel motor 100 down to the cooling target temperature $T_{M.target}$ set according to the temperature decrease amount $\Delta T_{M.cool}$ required for the in-wheel motor 100. Thereafter, the in-wheel motor cooling apparatus 300 may manage such that the maximum reached temperature $T_{M.init}+\Delta T_{M.rise}$ of the in-wheel motor 100 does not exceed the limit temperature $T_{M.max}$ of the in-wheel motor 100.

At steps S650 to S670, the in-wheel motor cooling apparatus 300 may measure a real-time temperature $T_M$ of the in-wheel motor 100 and may drive the water pump WP1 until the real-time temperature $T_M$ becomes below the cooling target temperature $T_{M.target}$.

At step S650, the in-wheel motor cooling apparatus 300 may compare a current temperature $T_M$ and the cooling target temperature $T_{M.target}$ of the in-wheel motor 100. When the current temperature $T_M$ of the in-wheel motor 100 is less than the cooling target temperature $T_{M.target}$, the in-wheel motor cooling apparatus 300 finishes the present logic without driving the water pump. However, at steps S660, S661, and S662, when the current temperature $T_M$ of the in-wheel motor 100 is greater than or equal to the cooling target temperature $T_{M.target}$, the in-wheel motor cooling apparatus 300 may calculate the temperature difference between an ambient air temperature and the cooling target temperature $T_{M.target}$, and control the cooling flow rate of the water pump WP1 based on the calculated temperature difference. The ambient air temperature may mean the atmospheric temperature. For example, the ambient air temperature may be approximately 45° C. The in-wheel motor cooling apparatus 300 may control the cooling flow rate of the water pump WP1, to decrease the current temperature $T_M$ of the in-wheel motor 100 to the cooling target temperature $T_{M.target}$.

In an embodiment, at steps S660, S661, and S662, when the temperature difference between the ambient air temperature and the cooling target temperature $T_M$ target is greater than the specific criterion, the in-wheel motor cooling apparatus 300 may determine the cooling flow rate of the water pump WP1 as the basic cooling flow rate. The in-wheel motor cooling apparatus 300 may also determine the cooling flow rate as the emergency cooling flow rate, when the temperature difference is less than or equal to the specific criterion.

The emergency cooling flow rate may have a cooling flow rate greater than the basic cooling flow rate. For example, the emergency cooling flow rate may be equal to the maximum cooling flow rate of the water pump WP1. The basic cooling flow rate may be appropriately determined in a range lower than the maximum cooling flow rate of the water pump in consideration of the electrical power efficiency. For example, when the maximum cooling flow rate of the water pump WP1 is 15 LPM, the emergency cooling flow rate is 15 LPM, and the basic cooling flow rate may be 10 to 12 LPM. The basic cooling flow rate may be greater than or equal to at least the cooling flow rate in the key-on state.

At step S661, when the temperature difference between the ambient air temperature and the cooling target temperature is greater than 20° C., the in-wheel motor cooling apparatus 300 may perform cooling in a first mode. The first mode may correspond to the case of determining the cooling flow rate of the water pump WP1 as the basic cooling flow rate.

At step S662, when the temperature difference between the ambient air temperature and the cooling target temperature is less than 20° C., the in-wheel motor cooling apparatus 300 may perform cooling in a first mode. The second mode may correspond to the case of determining the cooling flow rate of the water pump WP1 as the emergency cooling flow rate.

According to the in-wheel motor cooling method, the in-wheel motor cooling apparatus 300 turns off the pump when the current sensor temperature $T_M$ of the in-wheel motor 100 is lower than the cooling target temperature $T_{M.target}$. To the contrary, the in-wheel motor cooling apparatus 300 cools the sensor temperature of the in-wheel motor 100 down to the cooling target temperature $T_{M.target}$ when the sensor temperature $T_M$ of the in-wheel motor 100 is higher than the cooling target temperature $T_{M.target}$.

During the above process, in the in-wheel motor cooling method, when the weather is hot such that the difference between the ambient air temperature and the cooling target temperature $T_{M.target}$ is small (e.g., 20° C. or less), the in-wheel motor is strongly cooled in the second mode since there is little effect of convection cooling. When the weather is cold such that the difference between the ambient air temperature and the cooling target temperature $T_{M.target}$ is high (e.g., above 20° C.), the water pump is weakly driven in the first mode to cool the in-wheel motor since a large cooling effect may be obtained by ambient air.

While the technical concept of this disclosure has been described in connection with what is presently considered to be practical embodiments, it is to be understood that the disclosure is not limited to the disclosed embodiments. On the contrary, the present disclosure intended to cover various modifications and equivalent arrangements included within the spirit and scope of the appended claims.

DESCRIPTION OF SYMBOLS

100: the in-wheel motor
170: the braking device
300: in-wheel motor cooling apparatus
310: the braking data calculation part
320: motor temperature measurement part
330: driving controller
340: cooling flow control part

What is claimed is:

1. An in-wheel motor cooling apparatus, comprising:
    a braking data calculation part configured to calculate a braking severity related to a braking data of a braking device of a driving state;
    a motor temperature measurement part configured to measure a temperature and a temperature change of the in-wheel motor of a driving-finished state;
    a driving controller configured to start driving of a water pump, in the driving-finished state, when the braking severity and the temperature change is above a predetermined standard; and
    a cooling flow control part configured to determine a cooling flow rate of the water pump in real-time based on a temperature of the in-wheel motor, when the driving of the water pump is started.

2. The in-wheel motor cooling apparatus of claim 1, wherein the driving state is a key-on state in which the vehicle is turned on, and wherein the driving-finished state is a key-off state in which the vehicle is turned off.

3. The in-wheel motor cooling apparatus of claim 2, wherein the braking data calculation part is configured to calculate the braking severity based on the braking data of the vehicle including a braking hydraulic pressure, a braking period, a driving speed and a heat dissipation coefficient of the vehicle in the key-on state.

4. The in-wheel motor cooling apparatus of claim 1, wherein:
    when the temperature of the in-wheel motor is greater than an emergency cooling temperature, the cooling flow control part determines the cooling flow rate of the water pump as an emergency cooling flow rate that is a maximum flow amount of the water pump; and
    wherein the emergency cooling temperature is less than a predetermined motor management temperature of the in-wheel motor by a first temperature difference.

5. The in-wheel motor cooling apparatus of claim 4, wherein:
    when the temperature of the in-wheel motor is greater than a basic cooling temperature and less than or equal to the emergency cooling temperature, the cooling flow control part determines the cooling flow rate of the water pump as a basic cooling flow rate less than the emergency cooling flow rate; and
    wherein the basic cooling temperature is less than the motor management temperature by a second temperature difference.

6. The in-wheel motor cooling apparatus of claim 5, wherein, when the basic cooling flow rate is less than the cooling flow rate during the driving of a vehicle, the cooling flow control part adjusts the basic cooling flow rate to be equal to the cooling flow rate during the driving.

7. The in-wheel motor cooling apparatus of claim 6, wherein, when the temperature of the in-wheel motor is less than or equal to the basic cooling temperature after the driving of the water pump is started, the driving controller stops the driving of the water pump.

8. An in-wheel motor cooling method, comprising:
   calculating a braking severity of the vehicle during driving by an in-wheel motor cooling apparatus, when a vehicle is turned off;
   measuring a temperature and a temperature change of the in-wheel motor of the vehicle of a key-off state in which the vehicle is turned off, by the in-wheel motor cooling apparatus;
   controlling driving of a water pump, in the key-off state, based on the calculated braking severity and the measured temperature change of the in-wheel motor, the in-wheel motor cooling apparatus; and
   controlling a cooling flow rate of the water pump in real-time based on a temperature of the in-wheel motor, by the in-wheel motor cooling apparatus, when driving of the water pump is started.

9. The in-wheel motor cooling method of claim 8, wherein calculating the braking severity further comprises:
   calculating braking energy with a braking data of the vehicle including a braking hydraulic pressure, a braking period, a driving speed, and a heat dissipation coefficient, in a driving state at key-on of the vehicle.

10. The in-wheel motor cooling method of claim 9, wherein controlling the driving of the water pump further comprises:
   starting the driving of the water pump if the braking energy is higher than a predetermined specific criterion and the temperature change of the in-wheel motor is greater than the predetermined specific criterion.

11. The in-wheel motor cooling method of claim 10, wherein controlling the cooling flow rate further comprises:
   determining the cooling flow rate of the water pump as an emergency cooling flow rate that is a maximum flow amount of the water pump, when the temperature of the in-wheel motor is greater than an emergency cooling temperature,
   wherein the emergency cooling temperature is less than a predetermined motor management temperature of the in-wheel motor by a first temperature difference.

12. The in-wheel motor cooling method of claim 11, wherein controlling the cooling flow rate further comprises:
   determining the cooling flow rate of the water pump as a basic cooling flow rate less than the emergency cooling flow rate, when the temperature of the in-wheel motor is greater than a basic cooling temperature and less than or equal to the emergency cooling temperature,
   wherein the basic cooling temperature is less than the motor management temperature by a second temperature difference.

13. The in-wheel motor cooling method of claim 12, wherein determining the cooling flow rate as the basic cooling flow rate further comprises:
   adjusting the basic cooling flow rate to be equal to the cooling flow rate at the key-on, when the basic cooling flow rate is less than the cooling flow rate at the key-on of the vehicle.

14. The in-wheel motor cooling method of claim 13, wherein controlling the driving of the water pump further comprises:
   stopping the driving of the water pump, after the driving of the water pump is started, when the temperature of the in-wheel motor is less than or equal to the basic cooling temperature.

15. An in-wheel motor cooling method, comprising:
   calculating a temperature increase amount of the in-wheel motor based on an initial temperature of a braking device after a key-off state of a vehicle;
   calculating a maximum reached temperature of the in-wheel motor based on the initial temperature and the temperature increase amount after a key-off of the in-wheel motor;
   calculating a cooling target temperature of the in-wheel motor based on a difference value between the maximum reached temperature and a limit temperature of the in-wheel motor; and
   measuring a real-time temperature of the in-wheel motor and driving a water pump until the real-time temperature is below the cooling target temperature.

16. The in-wheel motor cooling method of claim 15, wherein a temperature increase amount of the in-wheel motor is proportional to the initial temperature of the braking device.

17. The in-wheel motor cooling method of claim 15, wherein driving the water pump further comprises:
   calculating a temperature difference between an ambient air temperature and the cooling target temperature; and
   controlling a cooling flow rate of the water pump based on the calculated temperature difference.

18. The in-wheel motor cooling method of claim 17, wherein controlling the cooling flow rate further comprises:
   determining the cooling flow rate of the water pump as a basic cooling flow rate when the temperature difference between the cooling target temperature and the ambient air temperature is more than a specific criterion; and
   determining the cooling flow rate as an emergency cooling flow rate when the temperature difference is less than the specific criterion,
   wherein the emergency cooling flow rate is more than the basic cooling flow rate.

19. The in-wheel motor cooling method of claim 18, wherein calculating the cooling target temperature further comprises:
   determining a resulting value obtained by subtracting the difference value from the initial temperature of the in-wheel motor as the cooling target temperature, when the difference value between the maximum reached temperature and the limit temperature is calculated.

20. The in-wheel motor cooling method of claim 15, further comprising:
   maintaining the maximum reached temperature of the in-wheel motor below the limit temperature of the in-wheel motor.

* * * * *